United States Patent

[11] 3,610,904

[72] Inventor Takafumi Kumagai
Kawasaki-shi, Japan
[21] Appl. No. 825,157
[22] Filed May 16, 1969
[45] Patented Oct. 5, 1971
[73] Assignee Nippon Columbia Company, Limited
Tokyo, Japan
[32] Priority May 25, 1968
[33] Japan
[31] 43/35394

[54] SQUARE-ROOT-EXTRACTING SYSTEM
10 Claims, 11 Drawing Figs.

[52] U.S. Cl. .................................................... 235/158, 235/160
[51] Int. Cl. .................................................... G06f 7/38
[50] Field of Search .......................................... 235/158, 160

[56] References Cited
UNITED STATES PATENTS

| | | | |
|---|---|---|---|
| 3,267,267 | 8/1966 | Clark | 235/158 X |
| 3,280,314 | 10/1966 | Weigler | 235/158 |
| 3,508,039 | 4/1970 | Cliff | 235/158 |

*Primary Examiner*—Malcolm A. Morrison
*Assistant Examiner*—Charles E. Atkinson
*Attorney*—Hill, Sherman, Meroni, Gross & Simpson

ABSTRACT: A system for extracting a square root of a number wherein a first and a second registers are used. The number is initially stored in the first register, on the other hand, a predetermined number is initially stored in the second register.

At first, the number in the second register 25 from the number in the first register, then the subtracted result is substituted for the number in the first register. After said substitution has been effected, a number which is equal to the number in the second register except that the predetermined digit position thereof is made greater than that by "1" is subtracted from the number in the first register. When the subtracted result is only negative after the first or second subtraction step has been effected, the number in the first register prior to the substitution step is shifted to the left by one digit. Then the subtraction step is performed again. Consequently the extracted square root of the number is obtained in the second register.

INVENTOR
Takafumi Kumagai
BY
Kelly, Sherman, Morris, Gross & Simpson
ATTORNEY

INVENTOR
Takafumi Kumagai
BY
Hill, Sherman, Meroni, Gross & Simpson
ATTORNEY

INVENTOR
*Takafumi Kumagai*
BY
*Hill, Sherman, Meroni, Gross & Simpson*
ATTORNEY INVENTOR
Takafumi Kumagai
BY
Hill, Sherman, Meroni, Gross & Simpson
ATTORNEY INVENTOR
Takafumi Kumagai
BY
Hill, Sherman, Meroni, Gross & Simpson
ATTORNEY

FIG. 7a

| ORDER / STEP | | 9 | 8 | 7 | 6 | 5 | 4 | 3 | 2 | 1 | 0 | M | S |
|---|---|---|---|---|---|---|---|---|---|---|---|---|---|
| I | A | | | | | | | | | | 3 | | 0 |
| | B | | | | | | | | | | | | |
| II | A | | | 3 | | | | | | | | | 7 |
| | B | | | | | | | | | | | | |
| III | A | | | 3 | | | | | | | | 7 | 3 |
| | B | | | | | | | | | | | | |
| IV | A | | | 3 | | | | | | | | | |
| V | B | | | | | | | | | | | | |
| VI | A | | | 2 | | | | | | | | | |
| VII | B | | | 1 | | | | | | | | | |
| IV | A | | | 1 | | | | | | | | | |
| V | B | | | 1 | | | | | | | | | |
| VIII | A | | | 2 | | | | | | | | | |
| | B | | | 1 | | | | | | | | | |
| X-1 | A | | 2 | | | | | | | | | 6 | 4 |
| | B | | | 1 | | | | | | | | | |
| IV | A | | 1 | 9 | 0 | | | | | | | | |
| V | B | | | 1 | 0 | | | | | | | | |
| VI | A | | 1 | 7 | 9 | | | | | | | | |
| VII | B | | | 1 | 1 | | | | | | | | |
| IV | A | | 1 | 6 | 8 | | | | | | | | |
| V | B | | | 1 | 1 | | | | | | | | |
| VI | A | | 1 | 5 | 6 | | | | | | | | |
| VII | B | | | 1 | 2 | | | | | | | | |
| IV | A | | | 2 | 8 | | | | | | | | |
| V | B | | | 1 | 6 | | | | | | | | |
| VI | A | | | 1 | 1 | | | | | | | | |
| VII | B | | | 1 | 7 | | | | | | | | |
| X-2 | A | | 1 | 1 | 0 | 0 | | | | | | 5 | 4 |
| | B | | | 1 | 7 | 0 | | | | | | | |
| IV | A | | | 9 | 3 | 0 | | | | | | | |
| V | B | | | 1 | 7 | 0 | | | | | | | |
| VI | A | | | 7 | 5 | 9 | | | | | | | |
| VII | B | | | 1 | 7 | 1 | | | | | | | |
| IV | A | | | 2 | 4 | 4 | | | | | | | |
| V | B | | | 1 | 7 | 2 | | | | | | | |
| VI | A | | | | 7 | 1 | | | | | | | |
| VII | B | | | 1 | 7 | 3 | | | | | | | |
| X-3 | A | | | 7 | 1 | 0 | 0 | | | | | 4 | 5 |
| | B | | | 1 | 7 | 3 | 0 | | | | | | |
| IV | A | | | 5 | 3 | 7 | 0 | | | | | | |
| V | B | | | 1 | 7 | 3 | 0 | | | | | | |

INVENTOR
Takafumi Kumagai
BY
ATTORNEY

FIG. 7b

| ORDER / STEP | | 9 | 8 | 7 | 6 | 5 | 4 | 3 | 2 | 1 | 0 | M | S |
|---|---|---|---|---|---|---|---|---|---|---|---|---|---|
| VI | A | | | 3 | 6 | 3 | 9 | | | | | | |
| VII | B | | | 1 | 7 | 3 | 1 | | | | | | |
| IV | A | | | 1 | 9 | 0 | 8 | | | | | | |
| V | B | | | 1 | 7 | 3 | 1 | | | | | | |
| VI | A | | | | 1 | 7 | 6 | | | | | | |
| VII | B | | | 1 | 7 | 3 | 2 | | | | | | |
| X-4 | A | | | 1 | 7 | 6 | 0 | 0 | | | | 3 | 5 |
| | B | | | 1 | 2 | 3 | 2 | 0 | | | | | |
| IV | A | | | | | 2 | 8 | 0 | | | | | |
| V | B | | | 1 | 7 | 3 | 2 | 0 | | | | | |
| VIII | A | | | 1 | 7 | 6 | 0 | 0 | | | | | |
| | B | | | 1 | 7 | 3 | 2 | 0 | | | | | |
| X-5 | A | | 1 | 7 | 6 | 0 | 0 | 0 | 0 | | | 2 | 6 |
| | B | | | 1 | 7 | 3 | 2 | 0 | 0 | | | | |
| IV | A | | 1 | 5 | 8 | 6 | 8 | 0 | 0 | | | | |
| V | B | | | 1 | 7 | 3 | 2 | 0 | 0 | | | | |
| VI | A | | 1 | 4 | 1 | 3 | 5 | 9 | 9 | | | | |
| VII | B | | | 1 | 7 | 3 | 2 | 0 | 1 | | | | |
| | | | | | | | | | | | | | |
| IV | A | | | 2 | 0 | 1 | 1 | 8 | 0 | | | | |
| V | B | | | 1 | 7 | 3 | 2 | 0 | 4 | | | | |
| VI | A | | | | 2 | 7 | 9 | 7 | 5 | | | | |
| VII | B | | | 1 | 7 | 3 | 2 | 0 | 5 | | | | |
| X-6 | A | | | 2 | 7 | 9 | 7 | 5 | 0 | 0 | | 1 | 6 |
| | B | | | 1 | 7 | 5 | 2 | 0 | 5 | 0 | | | |
| IV | A | | | 1 | 0 | 6 | 5 | 4 | 5 | 0 | | | |
| V | B | | | 1 | 7 | 3 | 2 | 0 | 5 | 0 | | | |
| VIII | A | | | 2 | 7 | 9 | 7 | 5 | 0 | 0 | | | |
| | B | | | 1 | 7 | 3 | 2 | 0 | 5 | 0 | | | |
| X-7 | A | | 2 | 7 | 9 | 7 | 5 | 0 | 0 | 0 | 0 | 0 | 7 |
| | B | | | 1 | 7 | 3 | 2 | 0 | 5 | 0 | 0 | | |
| IV | A | | 2 | 6 | 2 | 4 | 2 | 9 | 5 | 0 | 0 | | |
| V | B | | | 1 | 7 | 3 | 2 | 0 | 5 | 0 | 0 | | |
| VI | A | | 2 | 4 | 5 | 1 | 0 | 8 | 9 | 9 | 9 | | |
| VII | B | | | 1 | 7 | 3 | 2 | 0 | 5 | 0 | 1 | | |
| | | | | | | | | | | | | | |
| IV | A | | | 1 | 9 | 9 | 4 | 2 | 4 | 4 | 4 | | |
| V | B | | | 1 | 7 | 3 | 2 | 0 | 5 | 0 | 7 | | |
| VI | A | | | | 2 | 6 | 2 | 1 | 9 | 3 | 6 | | |
| VII | B | | | 1 | 7 | 3 | 2 | 0 | 5 | 0 | 8 | | |
| XIV | A | | | | 2 | 6 | 2 | 1 | 9 | 3 | 6 | 0 | 7 |
| | B | | | 1 | 7 | 3 | 2 | 0 | 5 | 0 | 8 | | |

INVENTOR
Takafumi Kumagai
BY
Hill, Sherman, Meroni, Gross & Simpson
ATTORNEY

FIG. 8a

| STEP \ ORDER | | 9 | 8 | 7 | 6 | 5 | 4 | 3 | 2 | 1 | 0 | M | S |
|---|---|---|---|---|---|---|---|---|---|---|---|---|---|
| I | A | | | | | | | | | 3 | 0 | | 0 |
| | B | | | | | | | | | | | | |
| II | A | | 3 | 0 | | | | | | | | | 7 |
| | B | | | | | | | | | | | | |
| III | A | | | | | | | | | | | 7 | 3 |
| | B | | | | | | | | | | | | |
| IV | A | | 3 | 0 | | | | | | | | | |
| V | B | | | 0 | | | | | | | | | |
| VI | A | | 2 | 9 | | | | | | | | | |
| VII | B | | | 1 | | | | | | | | | |
| IV | A | | 2 | 8 | | | | | | | | | |
| V | B | | | 1 | | | | | | | | | |
| VI | A | | 2 | 6 | | | | | | | | | |
| VII | B | | | 2 | | | | | | | | | |
| IV | A | | | 0 | | | | | | | | | |
| V | B | | | 5 | | | | | | | | | |
| VIII | A | | | 5 | | | | | | | | | |
| | B | | | 5 | | | | | | | | | |
| X-1 | A | | 5 | 0 | 0 | | | | | | | 6 | 4 |
| | B | | | 5 | 0 | | | | | | | | |
| IV | A | | 4 | 5 | 0 | | | | | | | | |
| V | B | | | 5 | 0 | | | | | | | | |
| VI | A | | 3 | 9 | 9 | | | | | | | | |
| VII | B | | | 5 | 1 | | | | | | | | |
| IV | A | | | 3 | 0 | | | | | | | | |
| V | B | | | 5 | 4 | | | | | | | | |
| VIII | A | | | 8 | 4 | | | | | | | | |
| | B | | | 5 | 4 | | | | | | | | |
| X-2 | A | | 8 | 4 | 0 | 0 | | | | | | 5 | 4 |
| | B | | | 5 | 4 | 0 | | | | | | | |
| IV | A | | 7 | 8 | 6 | 0 | | | | | | | |
| V | B | | | 5 | 4 | 0 | | | | | | | |
| VI | A | | 7 | 3 | 1 | 9 | | | | | | | |
| VII | B | | | 5 | 4 | 1 | | | | | | | |

INVENTOR
Takafumi Kumagai
BY
Hill, Sherman, Meroni, Gross & Simpson
ATTORNEY

FIG. 8b

| ORDER / STEP | | 9 | 8 | 7 | 6 | 5 | 4 | 3 | 2 | 1 | 0 | M | S |
|---|---|---|---|---|---|---|---|---|---|---|---|---|---|
| IV | A | | | 2 | 4 | 4 | | | | | | | |
| V | B | | | 5 | 4 | 7 | | | | | | | |
| VIII | A | | | 7 | 9 | 1 | | | | | | | |
| | B | | | 5 | 4 | 7 | | | | | | | |
| X-3 | A | | 7 | 9 | 1 | 0 | 0 | | | | | 4 | 5 |
| | B | | | 5 | 4 | 7 | 0 | | | | | | |
| IV | A | | 7 | 3 | 6 | 3 | 0 | | | | | | |
| V | B | | | 5 | 4 | 7 | 0 | | | | | | |
| VI | A | | 6 | 8 | 1 | 5 | 9 | | | | | | |
| VII | B | | | 5 | 4 | 7 | 1 | | | | | | |
| IV | A | | 6 | 2 | 6 | 8 | 8 | | | | | | |
| V | B | | | 5 | 4 | 7 | 1 | | | | | | |
| VI | A | | 5 | 7 | 2 | 1 | 6 | | | | | | |
| VII | B | | | 5 | 4 | 7 | 2 | | | | | | |
| | | | | | | | | | | | | | |
| IV | A | | | 7 | 9 | 4 | 8 | | | | | | |
| V | B | | | 5 | 4 | 7 | 6 | | | | | | |
| VI | A | | | 2 | 4 | 7 | 1 | | | | | | |
| VII | B | | | 5 | 4 | 7 | 7 | | | | | | |
| X-4 | A | | 2 | 4 | 7 | 1 | 0 | 0 | | | | 3 | 5 |
| | B | | | 5 | 4 | 7 | 7 | | | | | | |
| IV | A | | 1 | 9 | 2 | 3 | 3 | 0 | | | | | |
| V | B | | | 5 | 4 | 7 | 7 | 0 | | | | | |
| VI | A | | 1 | 3 | 7 | 5 | 5 | 9 | | | | | |
| VII | B | | | 5 | 4 | 7 | 7 | 1 | | | | | |
| IV | A | | | 8 | 2 | 7 | 8 | 8 | | | | | |
| V | B | | | 5 | 4 | 7 | 7 | 1 | | | | | |
| VI | A | | | 2 | 8 | 0 | 1 | 6 | | | | | |
| VII | B | | | 5 | 4 | 7 | 7 | 2 | | | | | |
| X-5 | A | | 2 | 8 | 0 | 1 | 6 | 0 | 0 | | | 2 | 6 |
| | B | | | 5 | 4 | 7 | 7 | 2 | 0 | | | | |
| IV | A | | 2 | 2 | 5 | 3 | 8 | 8 | 0 | | | | |
| V | B | | | 5 | 4 | 7 | 7 | 2 | 0 | | | | |
| VI | A | | 1 | 7 | 0 | 6 | 1 | 5 | 9 | | | | |
| VII | B | | | 5 | 4 | 7 | 7 | 2 | 1 | | | | |

INVENTOR
Takafumi Kumagai
BY
Hill, Sherman, Meroni, Gross & Simpson
ATTORNEY

FIG. 8c

| STEP | ORDER | 9 | 8 | 7 | 6 | 5 | 4 | 3 | 2 | 1 | 0 | M | S |
|---|---|---|---|---|---|---|---|---|---|---|---|---|---|
| IV | A | | | | 6 | 2 | 9 | 9 | 4 | | | | |
| V | B | | | 5 | 4 | 7 | 7 | 2 | 2 | | | | |
| VIII | A | | | 6 | 1 | 0 | 7 | 1 | 6 | | | | |
| | B | | | 5 | 4 | 7 | 7 | 2 | 2 | | | | |
| X-6 | A | | 6 | 1 | 0 | 7 | 1 | 6 | 0 | 0 | | 1 | 6 |
| | B | | | 5 | 4 | 7 | 7 | 2 | 2 | 0 | | | |
| IV | A | | 5 | 5 | 5 | 9 | 4 | 3 | 8 | 0 | | | |
| V | B | | | 5 | 4 | 7 | 7 | 2 | 2 | 0 | | | |
| VI | A | | 5 | 0 | 1 | 1 | 7 | 1 | 5 | 9 | | | |
| VII | B | | | 5 | 4 | 7 | 7 | 2 | 2 | 1 | | | |
| | | | | | | | | | | | | | |
| IV | A | | | | 8 | 2 | 2 | 1 | 5 | 0 | | | |
| V | B | | | 5 | 4 | 7 | 7 | 2 | 2 | 5 | | | |
| VIII | A | | | 6 | 2 | 9 | 9 | 3 | 7 | 5 | | | |
| | B | | | 5 | 4 | 7 | 7 | 2 | 2 | 5 | | | |
| X-7 | A | | 6 | 2 | 9 | 9 | 3 | 7 | 5 | 0 | 0 | 0 | 7 |
| | B | | | 5 | 4 | 7 | 7 | 2 | 2 | 5 | 0 | | |
| IV | A | | 5 | 7 | 5 | 1 | 6 | 5 | 2 | 5 | 0 | | |
| V | B | | | 5 | 4 | 7 | 7 | 2 | 2 | 5 | 0 | | |
| VI | A | | 5 | 2 | 0 | 3 | 9 | 2 | 9 | 9 | 9 | | |
| VII | B | | | 5 | 4 | 7 | 7 | 2 | 2 | 5 | 1 | | |
| | | | | | | | | | | | | | |
| IV | A | | | 2 | 7 | 4 | 4 | 2 | 7 | 2 | 0 | | |
| V | B | | | 5 | 4 | 7 | 7 | 2 | 2 | 5 | 5 | | |
| XIV | A | | | 2 | 7 | 4 | 4 | 2 | 7 | 2 | 0 | 0 | 7 |
| | B | | | 5 | 4 | 7 | 7 | 2 | 2 | 5 | 5 | | |

INVENTOR
Takafumi Kumagai
BY
Kille, Sherman, Meroni, Gross & Simpson
ATTORNEY

SQUARE-ROOT-EXTRACTING SYSTEM

BACKGROUND OF THE INVENTION

This invention relates to a square-root-extracting system.

DESCRIPTION OF THE PRIOR ART

Conventionally, square-root-extracting systems have been proposed, one of which is so designed that the square root of a number $n$ is extracted by virtue of the fact that an equation $$n^2=\sum_{i=0}^{n-1} 2i+1$$

holds true. In such system, a means for successively producing odd numbers 1, 3, 5,, ... is required in order to perform the square-root-extracting operation. Furthermore, complex controlling steps should be adopted when such odd numbers are employed. Another great drawback of such conventional system is the incapability of producing a square-root-extraction result of which the number of digits is greater than one-half of the number of digit portions of the register.

There have also conventionally been proposed systems capable of producing a square-root-extraction result of which the number of digits is greater than one-half of the number of digit portions of the register. In such systems, however, at least three registers are required. In the case where use is made of three or more registers, the controlling steps inevitably become greatly complicated.

SUMMARY OF THE INVENTION

Accordingly, it is an object of this invention to provide a novel square-root-extracting system capable of producing a square-root-extraction result of which the number of digits is greater than one-half of the number of digit portions of the register.

Another object of this invention is to provide a novel square-root-extracting system capable of producing a square-root-extraction root-extraction result by using only two registers.

Still another object of this invention is to provide a square-root-extracting system using two registers, adder-subtractor, necessary gate circuits, denomination order memory and decimal point counter, thereby producing a square-root-extraction result through simple controlling steps.

Other objects, features and advantages of the present invention will become apparent from the following description taken in conjunction with the accompanying drawings.

BRIEF DESCRIPTION OF THE DRAWINGS

FIGS. 7a and 7b show concrete numerical examples useful for explaining the square-root-extracting system shown in FIG. 2; and FIGS. 8a and 8b and 8c show other concrete numerical examples.

DESCRIPTION OF THE PREFERRED EMBODIMENTS.

Figure 1:
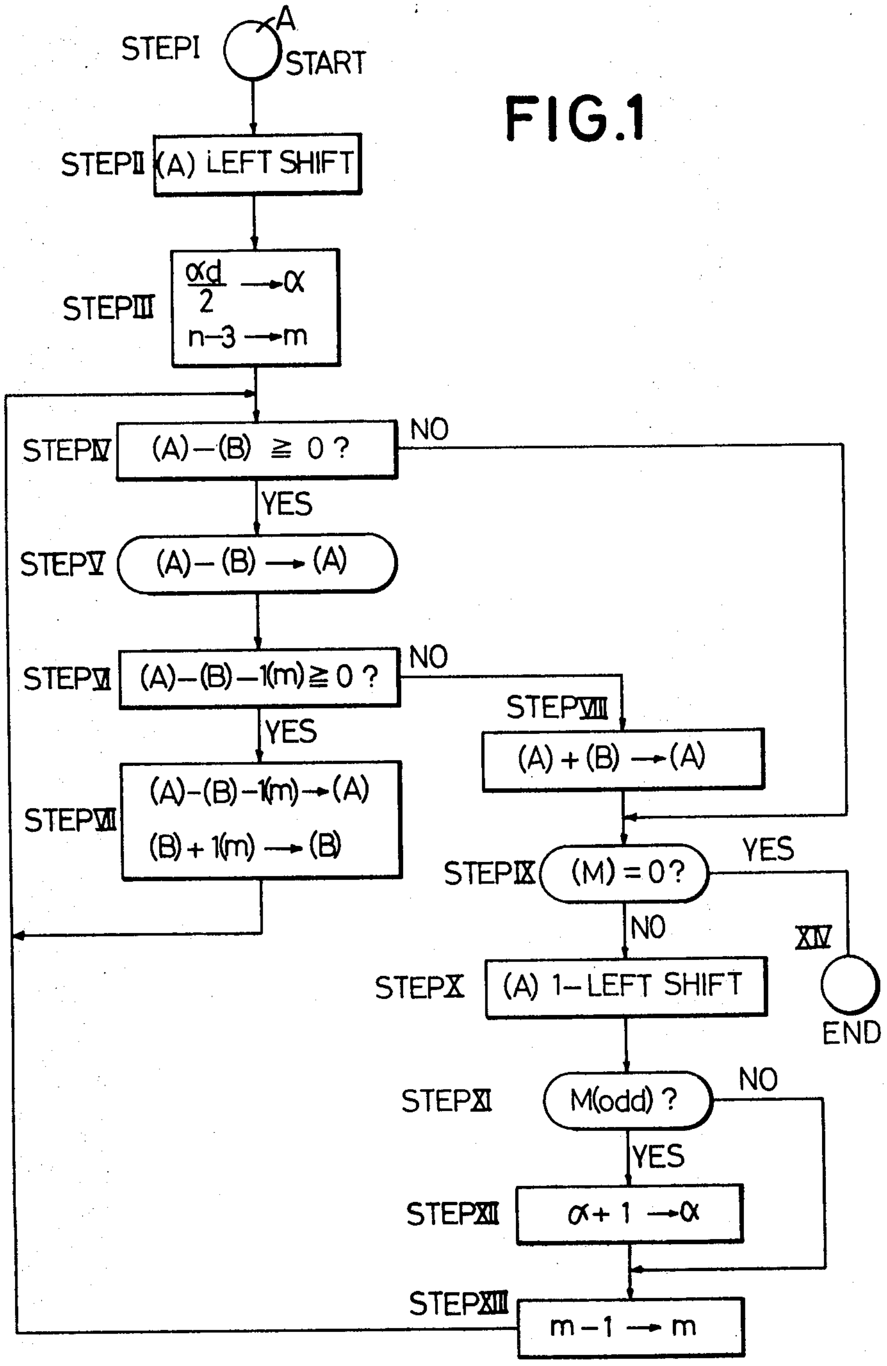
FIG. 1 is a flow chart useful for explaining the square-root-extracting system according to an embodiment of the present invention.

The square-root-extracting system according to the present invention will be described with reference to the flow chart of FIG. 1.

STEP I: A number whose square root is to be extracted is admitted into a first shift register A. This is shown as "-START" in FIG. 1.

STEP II: Upon admission of the number whose square root is to be extracted into the register A in STEP I, the number is shifted toward the most significant digit portion of the register A or left shifted. This is shown as "(A) LEFT SHIFT" in FIG. 1.

On the assumption that the number of digit portions of the register A is $n$, the digit portions of the register A are designated as 0th-digit portion, 1st-digit portion, ..., $(n-1)$st-digit portion, from the least significant digit portion toward the most significant digit portion, respectively.

An example of the left shift of the register A is effected as follows:

If a number whose square root is to be extracted is greater than "1" when it is sectioned at every two digits with the decimal point position as the reference, then the left shift of the register A is continued until the less significant digit number in the most significant one of the sections each containing two digits arrives at the $(n-3)$rd-digit portion of the register A. On the other hand, if the number whose square root is to be extracted is smaller than "1", then the left shift of the register A is continued until the less significant digit number of the most significant one of the sections which are less significant than the decimal point position arrives at the $(n-3)$rd-digit portion of the register A. Such left shift is controlled in accordance with an output showing whether or not a number other than "0" is present in the $(n-2)$nd- or $(n-3)$rd-digit portion of the register A and output representing the numerical content of a decimal point counter S of which the content is sequentially converted to "+1" in synchronism with the shift. The initial content of the decimal point counter S is set to the number corresponding to the decimal point position of the number whose square root is to be extracted which is admitted into the register A. Numerals "0", "1", "2", ... of the decimal point counter S indicate that the decimal point is located at the lower right hand side of the 0th-digit portion, 1st-digit, 2nd-digit portion, ... as viewed on the register A. This can be represented by the following logical equation:

$$[A(n-2)+A(n-3)+S(n-1)]\cdot[S(n-1)+(S(n-3)+S(n-5)+\ldots]=1$$ where when K=0, 1, 2, ..., $(n-1)$, A(K)=1: The content in the Kth-digit portion of the register A is not "0."

A(K)=0: The content in the Kth-digit portion of the register A is "0".

S(K)=1: The numerical content of the decimal point counter S related to the register A is "K" representing the Kth-digit portion of the register A.

S(K)=0: The content of the decimal point counter S related to the register A is not "K" representing the Kth-digit portion of the register A.

Assume that the number entered in the register A in STEP I is "3" for example. Then this number "3" is initially present in the 0th-digit portion of the register A, and the content of the decimal point counter S is "O". Therefore, the left shift is continued until the number "3" arrives at the $(n-3)$rd-digit portion of the register A. In case a number "0.3" is entered in the register A, then "3" of this number is initially located at the 0th-digit portion of the register A, and the content of the decimal point counter is "1". Therefore, the left shift is continued until that "3" arrives at the $(n-2)$nd-digit portion of the register A. If the number entered in the register A is "35" for example, the left shift is continued until 373" and "5" of this number arrives at the $(n-2)$nd-digit and $(n-3)$rd-digit portions of the register A respectively. If the number is "0.03,' ' then the left shift is continued until "3" of this number arrives at the $(n-3)$rd-digit portion of the register A.

STEP III: A number $(n-3)$ (this number is represented by $m$) is set in a denomination order memory M of a counter construction. This is shown as "$n-3\rightarrow m$" on the flow chart. "1" is subtracted from the content $m$ set in the denomination order memory M each time the below-mentioned STEP XIII is performed. Furthermore, the content (this will be represented by $\alpha d$) of the decimal point counter S when the left shift is completed in STEP III is multiplied by one-half, so that a number (this will be represented by $\alpha$) corresponding to the integer part is obtained. For example, when $\alpha d$=6, $\alpha$ is "3" because 6×½=3. When $\alpha d$=9, $\alpha$ is "4" because 9×½=4.5. This is shown as "($\alpha d$/2) $\alpha$" on the flow chart.

STEP IV: After the STEP III Has been completed, discrimination is made as to whether the numerical content of the register A is greater than or equal to the numerical content of a second register B.This is shown as "(A)−(B)≧ 0?" on the flow chart. The number of digit portions of the register B is equal to that $n$ of the register A. A numerical content representing the square root of a number of which the most significant digit position corresponds to the ($n$−3)rd-digit portion of the register B is available from the register B. If the numerical content of the register A is greater than or equal to that of the register B, this is represented by "Yes". If the numerical content of the register A is smaller than that of the register B, this is represented by "NO". This "NO" indicates that the square root is extracted digit by digit from the most significant denomination order on the register B every time "-NO" is obtained.

STEP V: In the case of "YES" in STEP IV, the numerical content of the register B is subtracted from that of the register A, and a result obtained through the subtraction becomes a new content of the register A. This is shown as "(A)−(B)→(A)" on the flow chart.

STEP VI: Discrimination is made of whether the numerical content of the register A which has been subjected to STEP V is greater than or equal to the number equal to the numerical content of the register B except that only the $m$th-digit number thereof is increased by "1". This is shown as "(A)−(B)1($m$)≧ 0?" on the flow chart. If the numerical content of the register A is greater than or equal to a number equal to the numerical content of the register B except that only the $m$th-digit number thereof is increased by "1," this is represented by "YES." If the former is smaller than the latter, this is indicated by "NO." This "NO" indicates that the square root is extracted digit by digit from the most significant denomination order on the register B every time "NO" is obtained, as is the case with STEP IV.

STEP VII: In the case of "YES" in STEP VI, a number equal to the numerical content of the register B except that only the $m$th-digit number is increased by "1" is subtracted from the numerical content of the register A, and a result obtained through the subtraction becomes a new content of the register A. Further, the number equal to the numerical content of the register B except that only the $m$th-digit number is increased by "1" becomes a new numerical content of the register B. These are shown as "(A)−(B)−1($m$)→(A) " and "(B)+1a($m$)→(B) " on the flow chart, respectively.

(After the foregoing STEP VII has been completed, the operation is returned to the STEP IV, and thus the STEP IV, STEP V, STEP VI and STEP VII are repeated in the named order.)

STEP VIII: In the case of "NO" in STEP VI, the numeral in the register A and that in the register B are added to each other, and a result obtained through the addition becomes a new numerical content of the register A. This is shown as "(A)+(B)→(A)" on the flow chart.

STEP IX: In STEP VIII or in case the discrimination result obtained through the STEP VI is "NO," a numerical content representing the most significant digit of the square root of a number to be extracted is stored in the $m$th-digit portion of the register B, and thus discrimination is made of whether or not a numerical content representing the square root of a number consisting of a predetermined number of digits has been obtained on the register B.

This discrimination is effected according to whether the content of the denomination order memory M which is obtained by the fact that "1" is subtracted therefrom at every STEP XIII which will be described later is "0" or not when the square root is extracted from the ($n$−3)rd-digit to the Oth-digit portion of the register B. This is shown as "(M)=O?" on the flow chart. In order to facilitate understanding, however, this is shown on the flow chart as if STEP IX were effected by way of STEP VIII in accordance with "NO" of STEP VI.

If the discrimination result obtained through STEP IV is "-NO," then discrimination is similarly made of whether a numerical content representing the square root of a number consisting of a predetermined number of digits has been obtained on the register B.

If the content of the denomination order memory M is "0," this is represented by "YES," and if it is not "0," this is represented by "NO".

STEP X: In the case of "NO" in STEP IX, the numerical content of the register A is shifted toward the more significant digit portion, that is, it is shifted to the left by one digit. This is shown as "(A) 1—SHIFT LEFT" on the flow chart.

STEP XI: When STEP X is effected, that is, when the discrimination result obtained through STEP IX is "NO", discrimination is made of whether $m$ is odd prior to the operation of "$m$−1→$m$" performed in STEP XIII which will be described later. If $m$ is odd, this is represented by "YES," and if it is even, this is represented by "NO". These are shown as "M(odd) ?" on the flow chart.

STEP XII: In case the discrimination result obtained through STEP XI is "YES," then the numerical content of the decimal point counter S is increased by "1". This is shown as "$\alpha$+1→ $\alpha$" on the flow chart.

STEP XIII: When STEP X is performed, that is, when the discrimination result obtained through STEP IX is "NO," the content of the denomination order memory M is reduced by "1" whether it is odd or even. This is shown as "$m$−1→$m$" on the flow chart.

In order to facilitate understanding, however, it is assumed on the flow chart that if the result of "M(odd) ?" in STEP XI is "NO," then the operation of "$m$−1→$m$" in STEP XIII is performed, and that if the result of "M(odd) ?" in STEP XI is "YES," then the operation of "$m$−1→$m$" in STEP XIII is performed after the operation "$\alpha$+1→$\alpha$" in STEP XII has been performed.

(After the foregoing STEPS X to XIII have been performed, the operation is returned to STEP IV, and thus the aforementioned STEPS are repeatedly performed.)

STEP XIV: When the discrimination result obtained in STEP IX is "YES," the square root extracting operation is completed. This is shown as "END" on the flow chart.

The content of the register B when the square-root-extracting operation is just completed corresponds to a numerical content representing the square root to be extracted. By indicating a decimal point at that digit position of this numerical content which corresponds to the numerical content of the decimal point counter S, the square root to be extracted can be obtained.

From the foregoing discussions made in conjunction with the flow chart, the square-root-extracting system according to the present invention has become apparent. Description will now be made of the present system from the view point of "-hardware".

Figure 2:
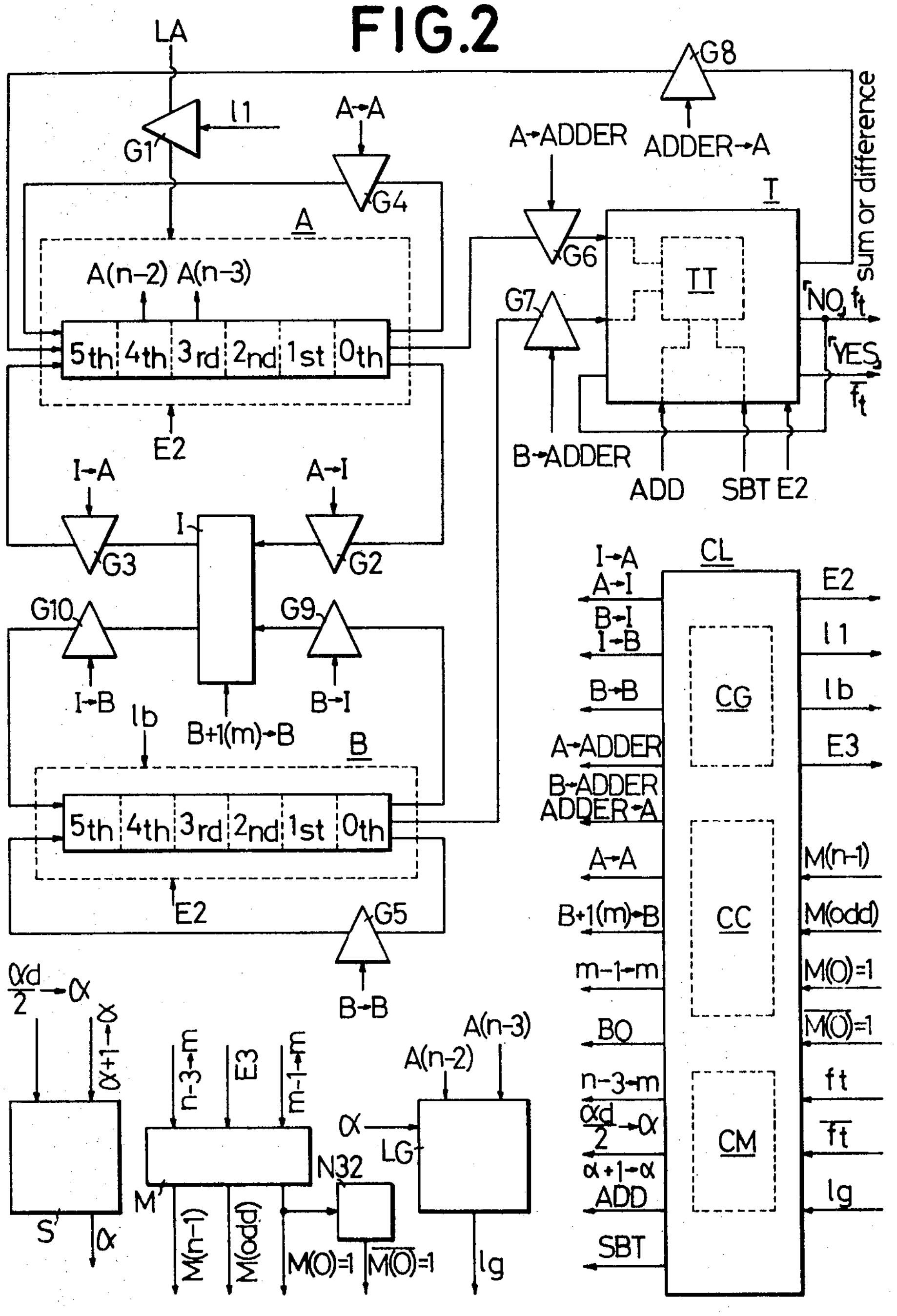
FIG. 2 is a block diagram showing the square-root-extracting system embodying the present invention.

Referring to FIG. 2, there are shown registers A and B each having six digit portions. There is also shown a control circuit CL for controlling the square-root-extracting operation.

According to STEP I, a number obtained on the line LA is admitted to the register A through a gate circuit G1 controlled by a control signal $l1$ available from the control circuit CL. At the same time, the register B is controlled by a control signal $lb$ available from the control circuit CL to be cleared so that all the numerical contents therein are reduced to "0." Thus, a signal "START" in STEP I is obtained. It is assumed that shift pulse E2 which will be described later is always supplied to the registers A and B. Such operation is well known in the art, and therefore detailed description thereof will be omitted.

Figure 3:
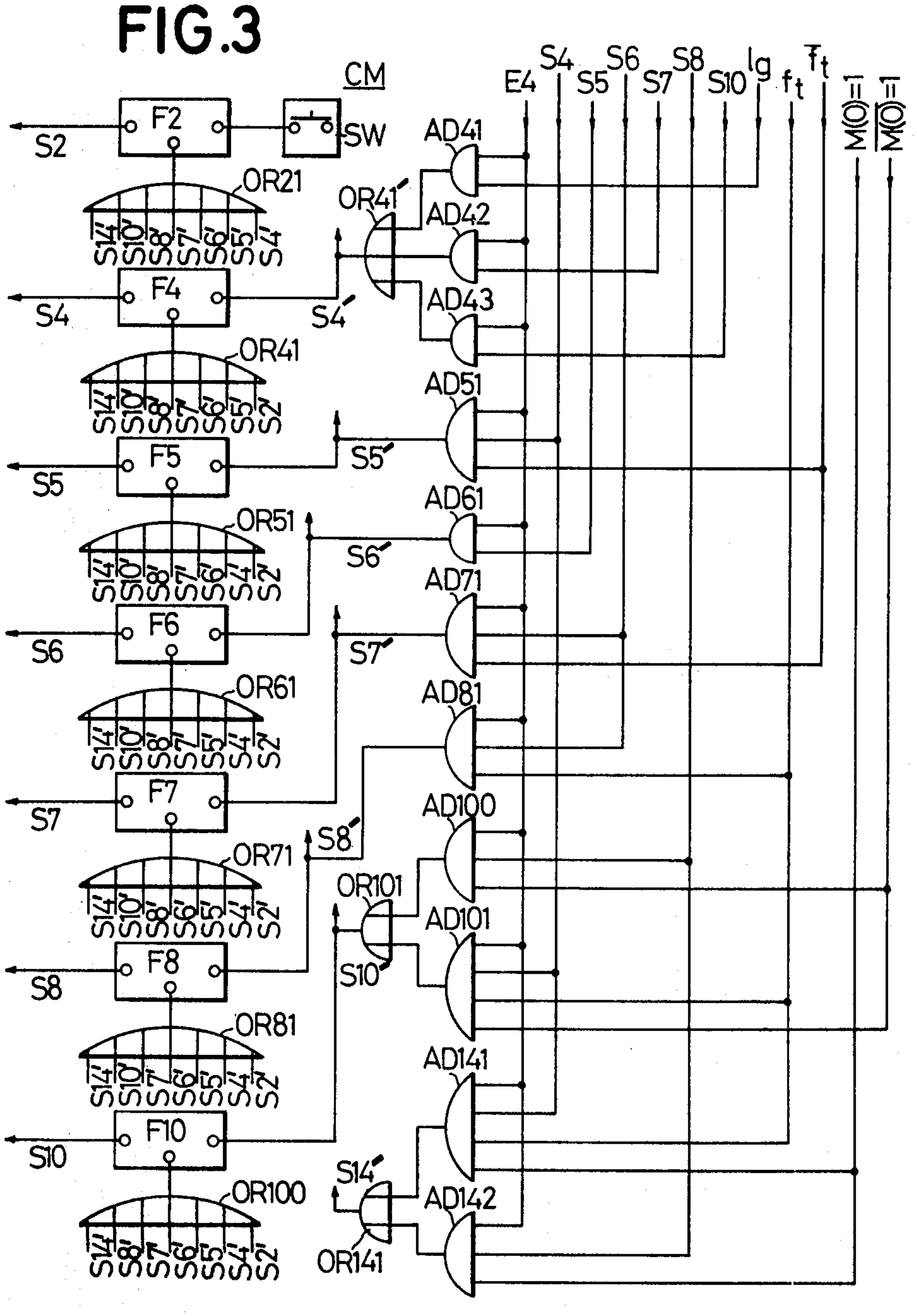
FIG. 3 is a connection diagram showing an example of instruction signal-generating circuit incorporated in the FIG. 2 system.

The control circuit CL includes a circuit CM for generating instruction signals for the aforementioned STEPS. The details of the instruction signal-generating circuit CM is shown in FIG. 3, wherein a flip-flop F2 is set by depressing a square-root-extracting operation starting key SW, so that a STEP II instruction signal S2 is provided.

Figure 4:
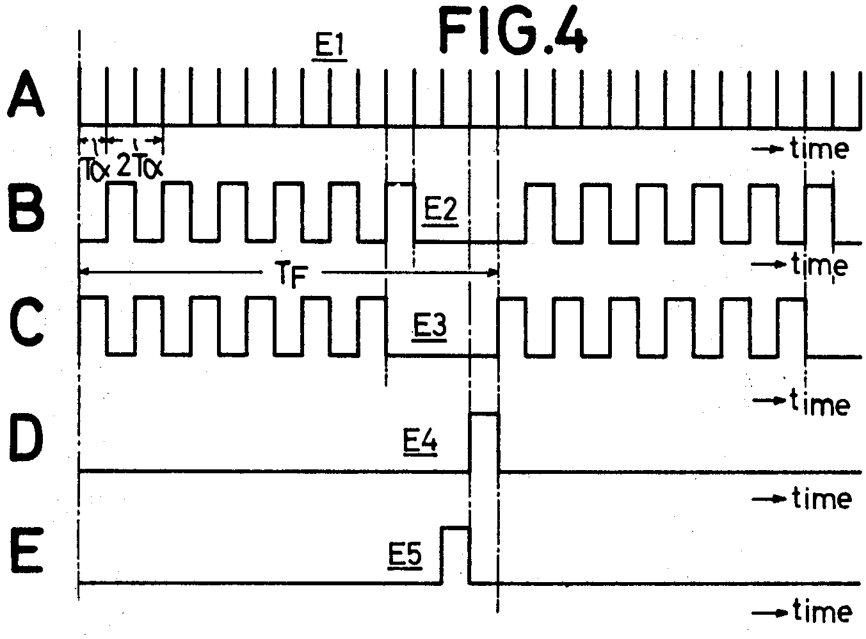
FIG. 4 is a view showing the waveform of pulse signal produced by the pulse generator shown in FIG. 2.

The control circuit CL also includes a pulse generator CG from which are available a synchronizing pulse train E1 having a cyclic period of Tα as shown in FIG. 4A, shift pulse train E2 wherein there occur subpulse trains each containing six consecutive pulses each having a cyclic period of 2Tα and width Tα with a time interval of Tα maintained between the starting point and the leading edge of the first pulse of each subpulse train, each of the subpulse trains having a cyclic period TF which corresponds to 15 times of that of the synchronizing pulse E1 or 15×Tα for example as shown in FIG. 4B, a shift pulse train E3 which is opposite polarity to that of E2 as shown in FIG. 4C, a STEP-converting instruction pulse E4 which occurs at a point of time which is spaced by Tα from the end of the cyclic period TF thereof for the time Tα as shown in FIG. 4D, and a pulse E5 which occurs at a point of time which is spaced by Tα from the starting point of the pulse E4 for the time Tα as shown in FIG. 4E.

Figure 5:
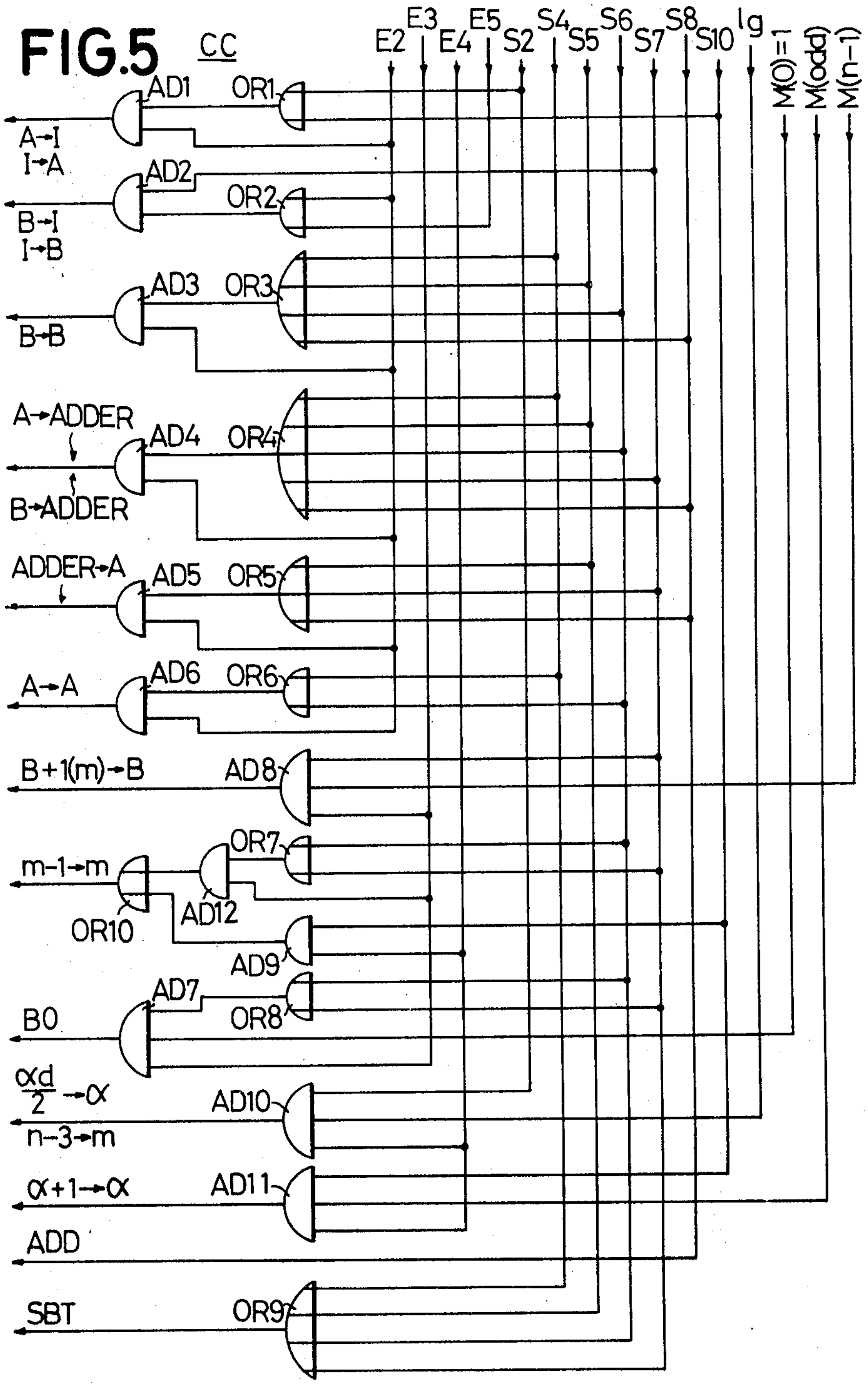
FIG. 5 is a connection diagram showing an example of the second control-signal-generating circuit shown in FIG. 2.

The control circuit CL also includes a control-signal-generating circuit CC, which is shown in detail in FIG. 5.

As will be seen from FIG. 5, an instruction signal S2 is supplied to an AND circuit AD1 through an OR circuit OR1, and the shift pulse E2 shown in FIG. 4B is also imparted to the AND circuit AD1. Thus, control signals "A→I" and "I→A" resulting from the application of the shift pulse E2 shown in FIG. 4B to the AND circuit AD1 are available from the latter during the period of the signal S2.

These control signals "A→I" and I→A" control gate circuits G2 and G3 respectively. The gate circuit G2 is provided between the least significant digit portion of the register A and a one digit shift register I, and the gate circuit G3 is provided between the most significant digit portion of the register A and the one digit shift register I.

Upon application of the shift pulse E2 to the register A, the latter is shifted to the right through a loop of the least significant digit portion of the register A—the gate circuit G2—register I—gate circuit G3—the most significant digit portion of the register A. In this case, the numerical content of the register A is shifted to the left digit by digit at every cyclic period of TF, since the control signals "A→I" and "I→A" are based upon the shift pulse E2, this shift pulse E2 occurs as a group of six such pulses at every cyclic period of TF and the number of digit portions of the register A is six.

Associated with the register A is a decimal point counter S in which is set a number representing that digit position of a number admitted in the register A at which a decimal point is indicated. The numerical content α of the decimal point counter S and the numerical contents A($n$—2) and A($n$—3) in the ($n$—2)nd- and ($n$—3)rd-digit portions of the register A are supplied to a logical circuit LG, so that detection is made of whether the logical equation in STEP II is satisfied or not. If the logical equation is satisfied in the logical circuit LG, then an output $lg$, representing this is obtained as left-shift-terminating signal, which in turn is supplied to the instruction signal-generating-circuit CM of the control circuit CL. The left-shift-terminating signal $lg$ is also supplied to an AND circuit AD41 to which is also supplied a step changing pulse E4 which is obtained at every cyclic period of TF, as shown in FIG. 3. Thus, an output S4′ based upon the pulse E4 is available from the AND circuit AD41, and it is applied to set flip-flop F4 through an OR circuit OR41′ so that STEP IV instruction signal S4 is obtained from the flip-flop F4.

On the other hand, S4′ is applied to reset flip-flop F2 through an OR circuit OR21, so that STEP II is completed.

During occurrence of the instruction signal S2, the operation of STEP III is performed. That is, signals based upon these signals S2, $lg$ and pulse E4 are obtained from an AND circuit AD10 as control signals "$\alpha d/2 \rightarrow \alpha$" and "$n$—3→$m$," since the instruction signal S2, left shift termination signal 1$g$ sand STEP changing pulse E4 have been supplied to the AND gate AD10, as shown in FIG. 5. The control signal "$\alpha d/2 \rightarrow \alpha$" is imparted to the decimal point counter S, and the numerical content of the decimal point counter S is multiplied by one-half, so that a number corresponding to the integer part is obtained. The decimal counter S adapted so that the content thereof is multiplied by one-half and a number corresponding to the integer part of the thus multiplied content is obtained may be constructed in a "8-4-2-1" code, 4 bit counter arrangement wherein a code content when the counter S is shifted to the right by one bit in accordance with the instruction signal "$\alpha d/2 \rightarrow \alpha$" can be obtained. The control signal "$n$—3→ $m$" is supplied to the denomination order memory M, so that the numerical content of the memory M becomes "$n$—3".

In this way the operation of STEP III is performed, and it is completed upon completion of the STEP II operation described above.

When the instruction signal S4 is obtained by way of STEP II and STEP III as described above, STEP IV is initiated. More specifically, since the instruction signal S4 is supplied to an AND circuit AD6 through an OR circuit OR6, to an AND circuit AD3 through an OR circuit OR3 and to an AND circuit AD4 through an OR circuit OR4, and the shift pulse E2 is imparted to the AND circuits AD6, AD3 and AD4, as shown in FIG. 5, signals based upon the shift pulses E2 which occur during the period for which the instruction signal S4 is available are obtained from the AND circuit AD6, AD3 and AD4 as control signals "A→A" "B→B" and "A→ADDER" and "B→ADDER," respectively.

The control signal "A→A" control a gate circuit G4 inserted in the loop between the least significant digit portion and the most significant digit portion of the register A, and the control signal "B→B" controls a gate circuit G5 inserted in the loop between the least significant digit portion and the most significant digit portion of the register B. The control signals "A→ADDER" and "B→ADDER" control AND circuits G6 and G7. The AND circuit G6 is interposed between the least significant digit portion of the register A and the input side of an adder-subtractor TT included in an adder-subtractor circuit T, and the AND circuit G7 is interposed between the least significant digit portion of the register B and the adder-subtractor TT.

Due to the fact that the registers A and B are controlled by the shift pulse E2, each of the contents of the registers A and B is inserted from the least significant digit portion to the most significant digit portion, while maintaining its own value. At this point, each of the contents of the registers A and B is supplied from the least significant digit portion to the adder-subtractor TT. In this case, a subtraction control signal SBT is supplied to the adder-subtractor TT. Thus, the adder-subtractor TT is made to operate as subtractor circuit to subtract the numerical content of the register B from that of the register A so that a subtraction output is available from the adder-subtractor circuit T. The subtraction control signal SBT is available from the control signal generating circuit CC of the control circuit CL through when the instruction signal S4 is permitted to pass through the OR circuit OR9, as shown in FIG. 5.

Figure 6:
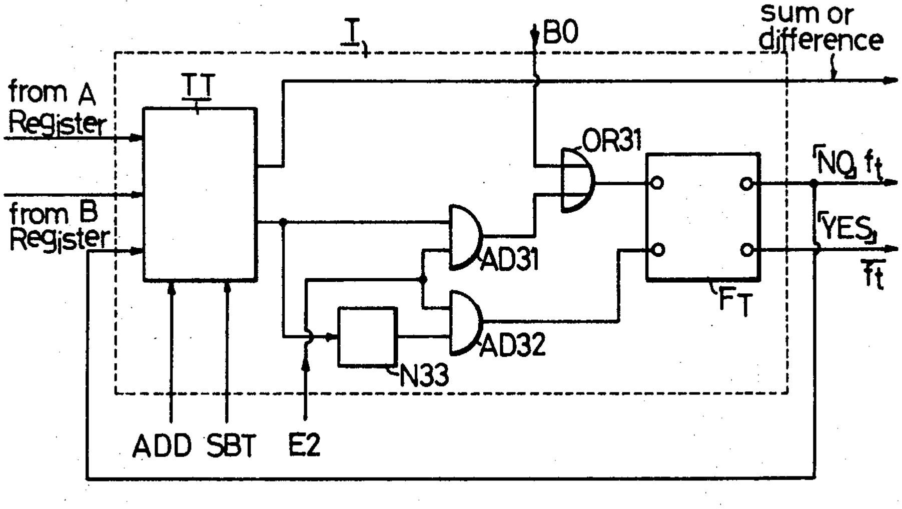
FIG. 6 is a connection diagram showing an example of the adder-subtractor circuit shown in FIG. 2.

The details of the adder-subtractor circuit T is shown in FIG. 6. Assume now that state "1" carry or borrow signals for the respective digits are provided by the adder-subtractor TT. Then, the state "1" carry or borrow signals are supplied to an AND circuit AD31 to which the shift pulse E2 is also imparted, and in turn the output of the AND circuit AD31 is applied to set a flip-flop FT through an OR circuit OR31. Output $ft$ when the flip-flop FT is set is fed back to the adder-subtractor TT so that the latter is enabled to effect addition or subtraction in each digit portion thereof according to whether the state "1" carry or borrow signal is obtained in the more significant digit portion immediately adjacent thereto. When the state "1" carry or borrow signal is not provided by the adder-subtractor TT, the state "0" carry or borrow signal is provided by the adder-subtractor TT. And the state "0" carry or borrow signal is supplied to an AND circuit AD32 to which the shift pulse E2 is imparted through a NOT circuit N63, and the flip-flop FT is reset by the output of the AND circuit AD32 which is based upon the shift pulse E2, so that an output $\overline{ft}$ is obtained from the flip-flop FT.

In STEP IV, the numerical contents of the register A and B are supplied to the adder-subtractor TT, and if the content of the register A is greater than or equal to that of the register B at the final stage, then the state of the borrow signal becomes "0" from "1" so that the output $\overline{ft}$ is provided by the flip-flop FT. That is, discrimination of "(A)−(B)≧0?" is effected in the adder-subtractor circuit T. The discrimination result is "YES," when there is obtained the output $\overline{ft}$.

The output $\overline{ft}$ is imparted to an AND circuit AD51 to which are also supplied instruction signal S4 and pulse E4, as shown in FIG. 3. Then, a flip-flop F5 is set by the output S5′ of the AND circuit AD51 which is based upon the pulse E4, so that there is obtained a STEP V instruction signal S5. On the other hand, a signal S5′ is supplied to the flip-flop F4 through an OR circuit OR41 so that the instruction signal S4 becomes extinct. Thus, the STEP IV operation is terminated.

When the instruction signal S5 is obtained, the STEP V operation is initiated. More specifically, the instruction signal S5 is supplied to the AND circuits AD3 and AD4 to which the shift pulse E2 is imparted through the OR circuits OR3 and OR4 respectively. Thus, control signals "B→B" and "A→ADDER" and "B→ADDER" are obtained from the AND circuits AD3 and AD4 respectively, as in STEP IV.

Since the gate circuit G5 is controlled by the control signal "B→B," the content of the register B is inserted from the least significant digit to the most significant digit through the gate circuit G5. Furthermore, since the gate circuits G6 and G7 are controlled by the control signals "A→ADDER" and "B→ADDER" respectively, the contents of the registers A and B are supplied to the adder-subtractor TT of the adder-subtractor circuit T. In this case, subtraction control signal SBT is obtained from an OR circuit OR9 on the basis of the instruction signal S5, and it controls the adder-subtractor TT so as to enable the latter to subtract the content of the register B from that of the register A. Thus, the subtraction result is obtained from this adder-subtractor TT. Further, the instruction signal S5 is supplied through the OR circuit. OR5 to the AND circuit AD5 to which the shift pulse E2 is imparted, from which the control signal "ADDER→A" is obtained which in turn is imparted to the gate circuit G8. This gate circuit G8 is inserted between the output side of the adder-subtractor TT and the most significant digit portion of the register A. Consequently, the subtraction result available from the adder-subtractor TT is admitted to the register A through the gate circuit G8, so that the content of the register A becomes the content representing the result obtained by subtracting the content of the register B from that of the register A. In this way, the "(A) −(B)→(A)" operation of STEP V is performed.

On the other hand, the instruction signal S5 is supplied to AND circuit AD61 to which the pulse E4 is also imparted as shown in FIG. 3, and the flip-flop F6 is set by an output S6′ based upon the pulse E4. Thus, a STEP VI instruction signal S6 is obtained from the flip-flop F6. The signal S6′ is supplied to reset the flip-flop F5 through the OR circuit OR51. As a result, the instruction signal S5 becomes extinct. In this way, the STEP V operation is completed.

When the instructional signal S6 is obtained, the STEP VI operation is initiated. That is, as shown in FIG. 5, the instruction signal S6 is supplied through the OR circuits OR3, OR4 and OR6 to the AND circuits AD3, AD4 and AD6 to which the shift pulse E2 is imparted respectively, so that there are obtained control signals "B→B" "A→ADDER" and "B→ADDER," "A→A."

The instruction signal S6 is also supplied through an OR circuit OR7 to an AND circuit AD12, so that the output based upon the shift pulse E3 is obtained through OR circuit OR10 as control signal "$m$−1→$m$."

Since the control signals "B→B," "A→ADDER," "B→ADDER" and "A→A" are imparted to the gate circuits G5, G6, G7 and G4, the contents of the registers A and B are supplied to the adder-subtractor TT as in STEP IV. In this case, the instruction signal S6 is obtained as subtraction control signal SBT through OR circuit OR9, so that in the adder-subtractor TT, the content of the register B is subtracted from that of the register A.

The control signal "$m$−1→$m$" and shift pulse E3 are supplied to the denomination order memory M, which has a ring counter arrangement of which the number of bits is equal to the number of digit portions of the registers A and B. Thus, "1" is subtracted from the content of the denomination order memory M in accordance with the control signal "$m$−1→$m$" and shift pulse E3. When the ($n$−3)rd-digit or $m$th-digit content of the register B arrives at the 0th digit, the content of the memory M becomes "O," so that a control signal $m(0)$ =1 is obtained from the memory M.

The control signal M(o)=1 is supplied to AND circuit AD7 to which the pulse E3 is also imparted, as shown in FIG. 5. The instruction signal S6 is also applied to the AND circuit AD7 through OR circuit OR8. Thus, an AND output based on the signals S6, M(o)=1 and pulse E3 is provided as borrow signal BO by the AND circuit AD7. This borrow signal BO is obtained at a point of time when the content of the memory M is "O," that is, the $m$th-digit content of the register B arrives at the 0th-digit portion of the latter. This borrow signal BO is supplied to set the flip-flop FT through OR circuit OR31 as shown in FIG. 6, and thus output ft is provided by the flip-flop FT. This output $ft$ is fed back to the adder-subtractor TT, so that when subtraction is made with respect to the $m$th-digit contents of the registers A and B, only the $m$th-digit content of the register B is increased by "1". As a result, a content of which the $m$th-digit number is made greater by "1" than the corresponding one of the register B is subtracted from the content of the register A. In this way, discrimination "(A)−(B)1l($M$)≧0?" in STEP VI is effected. Thus, if the condition "(A)=(B)−1($m$)≧0?" is satisfied, then a "YES" signal is obtained from the adder-subtractor TT (since state "O" borrow signal is produced), and it is supplied to reset the flip-flop FT through inhibit circuit N33 AND circuit AD32 so that a control signal $\overline{ft}$ or "YES" signal is provided by the flip-flop FT.

The control signal $\overline{ft}$ is supplied to an AND circuit AD71 to which the instruction signal S6 and pulse E4 are also imparted, as shown in FIG. 3, and a flip-flop F7 is set by an output S7′ of the AND circuit AD71 at the point of time when the pulse E4 occurs, so that a STEP VII instruction signal S7 is obtained. At this point, a signal S7′ is supplied to reset the flip-flop F6 through OR circuit OR61, so that the instruction signal S6 becomes extinct. Thereupon, the STEP VI operation is terminated.

When the instruction signal S7 is obtained, the STEP VII operation to the AND circuit AD2 to which the pulses E2 and E5 are also imparted, through the OR circuit OR2 as shown in FIG. 5, so that control signals "B→I" and "I→B" based on the pulses E2 and E5 respectively are obtained from the AND circuit AD2.

The instruction signal S7 is also supplied through OR circuit OR4 to AND circuit AD4 to which the pulse E2 is imparted, so that control signals "A→ADDER" and "B→ADDER" are obtained from the AND circuit AD4.

Furthermore, the instruction signal S7 is supplied through OR circuit OR5 to AND circuit AD5 to which the pulse E2 is imparted, so that a control signal "ADDER→A" is obtained from the AND circuit AD5.

The control signals "B→I" and "I→B" control gate circuits G9 and G10 respectively. The gate circuit G9 is interposed between the least significant digit portion of the register B and the register I, and the gate circuit G10 is provided between the register I and the most significant digit portion of the register B. Thus, the content of the register B is entered from the least significant digit portion thereof to the most significant digit portion thereof through the register I. In this case, the output of the AND circuit AD2 to which is imparted the pulse E5 in addition to the pulse E2 serves as control signals "B→I" and "I→B". Therefore, if the output of the AND circuit AD2 when only the shift pulse E2 is imparted thereto were made to serve as control signals "B→I" and "I→B," the register B would be shifted to the left by one digit as described above in connection with STEP II. In actuality, however, this is not the case because of the presence of the pulse E5.

The gate circuits G6 and G7 are controlled by the control signals "A→ADDER" and "B→ADDER" respectively, and therefore the contents of the registers A and B are supplied to the adder-subtractor TT. In this case, a subtraction control signal SBT is obtained through OR circuit OR9 on the basis of an instruction signal S7 as shown in FIG. 5, whereby the adder-subtractor TT is made to operate to subtract the content of the register B from that of the register A so that the subtraction result is obtained from the adder-subtractor TT.

As described above in connection with STEP VI, the instruction signal S7 is supplied through the OR circuit OR7 to an AND circuit AD12 to which the pulse E3 is imparted, and the output of the AND circuit AD12 is obtained as control signal "$m-1\rightarrow m$" through the OR circuit OR10. Then, the control signal "$m-1\rightarrow m$" and pulse E3 are imparted to the denomination order memory M. Thus, "1" is subtracted from the content of the denomination order memory M in accordance with the control signal "$m-1\rightarrow m$" and pulse E3, so that the control signal M(O)=1 is provided by the memory M as in STEP VI.

The control signal M(O)=1 is supplied to the AND circuit AD7 to which the pulse E3 is also supplied, as shown in FIG. 5. Thus, an AND output based on the signals S7, M(O)=1 and pulse E3 is available as borrow signal BO from the AND circuit AD7.

This borrow signal BO is supplied to set the flip-flop FT through OR CIRCUIT OR31 so that an output *ft* is provided by the flip-flop FT, as shown in FIG. 6. This output *ft* is fed back to the adder-subtractor TT, and thus only the *m*th-digit content of the register B is increased by "1" when subtraction is effected with respect to the *m*th-digit contents of the registers A and B. As a result, a content obtained by increasing the *m*th-digit content of the register B by "1" is subtracted from that of the register A.

The subtraction result obtained from the adder-subtractor TT is admitted to the register A through a gate circuit G8 controlled by the control signal "ADDER→A," and the content of the register A turns out to be the subtraction result. That is, the operation of "(A)−(B)−1($m$)→(A)" is performed.

The denomination order memory M is supplied with the pulse E3, and when the content thereof becomes ($n-1$), a control signal M($n-1$) is obtained from this denomination order memory M. This control signal M($n-1$) is supplied to the AND circuit AD8 to which are also applied the control signal S7 and pulse E3, as shown in FIG. 5. Thus, an output based on the instruction signal S7, pulse E3 and control signal M($n-1$) is obtained as control signal "B+1($m$)→B" from the AND circuit AD8, and it is supplied to the register I. The *m*th-digit content of the register B is located in the register I when the control signal M($n-1$) is obtained. Thus, the content of the register B is substituted by a content obtained by increasing the *m*th-digit content of the register B by "1." That is, the operation of "B+1($m$)→B" is performed.

The instruction signal S7 is supplied to an AND circuit AD42 to which the pulse E4 is also imparted, as shown in FIG. 3. Thus, the output of the AND circuit AD42 based on he signal S7 and pulse E4 is supplied through an OR circuit OR41′ as output S4′, which in turn is supplied to set the flip-flop F4 so that instruction signal S4 is available from the flip-flop F4. The output S4′ is also supplied to reset the flip-flop F7 through an OR circuit OR71, so that the instruction signal S7 becomes extinct. In this way, the STEP VII operation is completed.

When the instruction signal S4 is obtained, the same operation as that described above in connection with STEP IV is performed in accordance with the contents of the registers A and B which have been subjected to STEP VII.

Subsequent to the STEP VI operation, the operations of STEP V—STEP VI—STEP VII—STEP IV—... are repeatedly performed under the same conditions as those described above.

Through the foregoing operations, discrimination of "(A)−(B)1($m$)≧0?" is effected in STEP VI. If the condition "(A)−(B)1($m$)≧0" is not satisfied, then the state "1" signal or borrow signal is provided by the adder-subtractor TT, and it is supplied to the AND circuit AD31 as shown in FIG. 6. The pulse E2 is also supplied to the AND circuit AD31 to set the flip-Flop FT so that control signal *ft* or "NO" signal is available from the latter.

When the control signal ft is initially obtained in the above manner, the number in the ($n-3$)rd-digit or *m*th-digit portion of the register B corresponds to the most significant digit of the extracted square root.

When the most significant digit of the extracted square root is thus determined, the control signal *ft* is supplied to an AND circuit AD81 to which are also imparted the pulse E4 and instruction signal S6, as shown in FIG. 3, so that an output S8′ based upon the pulse E4 and signals S6 and *ft* is obtained which in turn is supplied to set flip-flop F8 to enable the latter to provide a STEP VIII instruction signal S8. The output S8′ is supplied to reset the flip-flop F6 through the OR circuit OR61. Thus, the instruction signal S6 becomes extinct, and the STEP VI operation is terminated.

When the instruction signal S8 is produced, the STEP VIII and STEP IX operations are initiated. That is, the instruction signal S8 is supplied through the OR circuit OR3 to the AND circuit AD3 to which the pulse E2 is also imparted, so that a control signal "B→B" is obtained from the AND circuit AD3.

The instruction signal S8 is also supplied through the OR circuit OR4 to the AND circuit AD4 to which the pulse E2 is also imparted, so that control signals "A→ADDER" and "B→ADDER" are available from the AND circuit AD4.

Further, the instruction signal S8 is supplied through the OR circuit OR5 to the AND circuit AD5 to which the pulse E2 is also applied, so that a control signal "ADDER→A" is obtained from the AND circuit AD5.

In this case, the instruction signal S8 serves as addition control signal ADD.

At this point, the gate circuits G5, G6 and G7 are controlled by the control signals "B→B," "A→ADDER" and "B→ADDER" respectively so that the contents of the registers A and B are supplied to the adder-subtractor TT. In this case, the contents of the registers A and B are added to each other since the adder-subtractor TT is controlled by the addition control signal ADD. The addition result is admitted to the register A through the gate circuit G8 which is under the control of the control signal "ADDER→A".

Thus, the content of the register A is replaced by the addition result so that the operation of "(A)+(B)→(A)" in STEP VIII is performed.

The instruction signal S8 is also supplied to an AND circuit AD100 to which are also supplied the pulse E4 and control signal M($\overline{O}$)=1 as shown in FIG. 3. The control signal M($\overline{O}$)=1 is obtained by passing the signal M(O)=1 through the NOT circuit N32. Thus, if the signal M($\overline{O}$)=1 is available at a point of time when the pulse E4 which occurs during the occurrence of the signal S8, then the output of the AND circuit AD100 based upon the pulse E4 is obtained as control signal S10′, which is in turn supplied to set a flip-flop F10 so that an instruction signal S10 is obtained from the latter. The control signal S10′ is also supplied to reset the flip-flop F8 through OR circuit OR81. As a result, the instruction signal S8 becomes extinct. This means that the square root has been extracted down to the 0th-digit in the register. In other words, this means that the condition (M)=0 is not met in the discrimination of "(M)=0,?" that is, the discrimination result is "NO." Thus, upon extinction of the signal S8, the STEP VIII and STEP IX operations are terminated.

When the instruction signal S10 is obtained, the STEP X, STEP XI, STEP XII and STEP XIII operations are initiated.

That is, the instruction signal S10 is supplied through the OR circuit OR1 to the AND circuit AD1 to which the pulse E2 is imparted, as shown in FIG. 5. Thus, control signals "A→I" and "I→A" are obtained from the AND circuit AD1.

At this point, the gate circuits G2 and G3 are controlled by the control signals "A→I" and "I→A," and thus there is established a loop of the least significant digit portion of the register A—gate circuit G2—register I—gate circuit G3—the most significant digit portion of the register A. In this case, since the register I for one digit is inserted in the loop, the content of the register A is shifted to the left by one digit. In this way, the operation of "(A)1-LEFT SHIFT" in STEP X is performed.

The instruction signal S10 is also supplied to an AND circuit AD11 to which the pulse E4 and control signal M(odd) are also imparted, and if the signal M(odd) is obtained at the point of time when the pulse E4 which occurs during the occurrence of the signal S10, that is, in the case of "YES," a control signal "$\alpha+1\rightarrow\alpha$" is obtained at the AND circuit. AD11. The signal M(odd) which is produced in the denomination order memory M is an output obtained by detecting that the content thereof is an odd number. When the control signal "$\alpha+1\rightarrow\alpha$" is obtained, this signal controls the decimal point counter S in such a manner that "1" is added to the content of the counter which has been existing therein so far. That is, the operation of "$\alpha+1\rightarrow\alpha$" in STEP XII is performed. Thereupon, the STEP XI and STEP XII operations are terminated.

Further, the instruction signal S10 is supplied to AND circuit AD9 to which the pulse E4 is also applied, and the output based upon the pulse E4 is obtained as control signal "$m-1\rightarrow m$" through the OR circuit OR10. This control signal "$m-1\rightarrow m$" is supplied to the denomination order memory M. Thus, control is effected to subtract "1" from the content which has existing so far, in the same manner as described above in connection with STEP VI STEP VII. In this way, the operation of "$m-1\rightarrow m$" in STEP XIII is performed. As will be seen from the flow chart, STEP XIII is performed through STEP XII if an "YES" signal is produced as a result of the discrimination of "M(odd)?" in STEP XI. On the other hand, if a "NO" signal is produced as a result of the discrimination of "M(odd),?" then STEP XIII is performed directly. This means that "1" is subtracted from the numerical content of the denomination order memory M every time STEP X is performed, whether the numerical content of the denomination order memory M is odd or even.

Since the instruction signal S10 is also supplied to an AND circuit AD43 to which the pulse E4 is also applied as shown in FIG. 3, the output of the AND circuit AD43 based upon the pulse E4 is obtained as output S4′ through an OR circuit OR41,′ and this output S4′ is supplied to reset the flip-flop F10 through the OR CIRCUIT OR100 so that the instruction signal S10 becomes extinct. Thus, the STEP X, STEP XI STEP XII and STEP XIII operations are terminated. At this point, the output S4′ is supplied to set the flip-Flop F4 so that the instruction signal S4 is provided by the latter.

When the instruction signal S4 is obtained, the same operation as that described above in connection with STEP IV is performed, starting with the conditions of the respective portions which have been subjected to STEP VIII to XIII. Thus, the aforementioned STEP operations are performed through STEP IV under the same condition as that described above.

Either prior or subsequent to the aforementioned STEP VIII to XIII, the discrimination of "(A)−(B)≧0?" is effected in STEP IV, and if the condition of "(A)−(B)≧0" is not satisfied, that is, in the case of "NO" a borrow signal representing the state "1" is provided by the adder-subtractor TT, and then it is supplied to AND circuit AD31, as shown in FIG 6. At this point, since the pulse E2 is imparted to the AND circuit AD31, the flip-flop FT is set so that control signal *ft* or "NO" signal is provided by the latter.

When the control signal *ft* is produced in the above manner, one digit of the square root is determined on the register B.

The control signal *ft* thus obtained is supplied to an AND circuit AD101 to which are also imparted the pulse E4 and signals S4 and M($\overline{O}$)=1, and thus an output S10′ is obtained through an OR circuit OR101 as in STEP VIII. This output S10′ is supplied to set the flip-flop F10, and an instruction signal S10 is obtained from the latter.

When the instruction signal S10 is obtained, the same operation as STEP X to XIII described above are performed. That is, control signals "A→I" and "I→A" are obtained from the AND circuit AD1 as shown in FIG. 5, and the content of the register A is shifted to the left by one digit. Thus, STEP X is performed. Further, control signal $\alpha+1\rightarrow\alpha$ is available from the AND circuit AD11 if the content of the denomination order memory M is odd, and "1" is added to the content of the decimal point counter S. Thus, STEP XI and STEP XII are performed. Furthermore, the output of AND circuit AD9 is obtained as control signal "$m-1\rightarrow m$" through the OR circuit OR10 to subtract "1" from the numerical content of the denomination order memory M. Thus, STEP XIII is performed.

After STEP X to XIII have been performed, a signal S4′ is obtained from an OR circuit OR41′ as shown in FIG. 3, and it is supplied to set the flip-flop F4 and the reset the flip-Flop F10. In this way, the STEP X to XIII operations are terminated, and now the STEP IV is initiated.

In case the condition of "(A)−(B)−1($m$)≧0" is satisfied as a result of the discrimination of "(A)−(B)−1($m$)≧0?" in STEP VI, then control signal *ft* or "NO" signal is provided by the flip-flop FT shown IN FIG. 6. At this point, the instruction signal S8 is available from the flip-Flop F8 shown in FIG. 8. When the instruction signal S8 is obtained, a control signal "B B" is obtained from the AND circuit AD3 as shown in FIG. 5, control signals "A→ADDER" and "B→ADDER" are available from the AND circuit AD4, and control signal "ADDER→A" is obtained from the AND circuit AD5. Thus, the STEP VIII operation is performed.

Furthermore, the instruction signal S8 is supplied to the AND circuit AD100 to which are also imparted the pulse E4 and control signal "M(O)=1," as shown in FIG. 3. However, in case the control signal "M($\overline{O}$)=1" is not obtained, no signal S10′ is obtained because no output is available from the AND circuit AD101. In that case, however, no signal S10 is available from the flip-flop F10. In the case where the signal "M($\overline{O}$)=1b8" is not obtained, the signal "M(O)=1" is obtained which is applied to an AND circuit AD142 to which are imparted the instruction signal S8 and pulse E4. Therefore, if the signal M(O)=1 is present at the point of time when the pulse E4 which occurs during the occurrence of the signal S8 is obtained, the output of an AND circuit AD142 is obtained as control signal S14′ through an OR circuit OR141. The control signal S14′ is supplied to reset the flip-flop F8 through an OR circuit OR81, so that the signal S8 becomes extinct. In the absence of the signal S8, the flip-flops F2 and F4 to F10 adapted to provide the instruction signals S2 and S4 to S10 are not set by the control signal S14′, so that the entire square-root-extracting operation is terminated. Upon the termination of the square-root-extracting operation, the contents in the ($n$−3)rd-digit to 0th-digit portions of the register B are obtained as the numerical values of the result obtained by extracting the square root. Thus, "END" of STEP XIV is obtained.

If the condition of "(A)−(B)≧0" is not satisfied in the discrimination of "(A)−(B)≧0?" effected in STEP IV, then control signal *ft* or "NO" signal is obtained from the flip-Flop FT shown in FIG. 6 as described above. The control signal ft is supplied to an AND circuit AD101 to which are imparted the signal S4, pulse E4 and signal M($\overline{O}$)=1, and it is also supplied to the AND circuit AD141 to which are also imparted the signal S4 pulse E4 and signal M(O)=1. However, in case the signal M($\overline{O}$)=1 is not obtained, no signal S10′ is obtained since no output is provided by the AND circuit AD101. In that case, therefore, no signal S10 is obtained. On the other hand, in case the signal M(O)=1 is obtained, then an output is provided by the AND circuit AD141. At this point, the output of the AND circuit AD141 is obtained as signal S14' through an OR circuit OR141.

The signal S14' is supplied to reset the flip-flop F4 through the OR circuit OR41, so that the signal S4 becomes extinct. When the signal S4 becomes extinct, the flip-flops F2 and F4 to F10 adapted to provide the instruction signals S2 and S4 to S10 are not set by the control signal S14', so that the entire square root extracting operation is terminated. Upon the termination of the entire square-root-extracting operation, the contents in the (*n*/3)rd-digit to 0th-digit portions of the register B are obtained as numerical values of the result obtained by extracting the square root. Thus, "END" of STEP XIV is obtained.

The content of the decimal point counter S when "END" of STEP XIV is obtained as described above represents that digit position of the number resulting from the square root extraction obtained on the register B at which the decimal point is to be indicated. Thus, it is possible to determine a square root extraction result from the numerical content of the register B and numerical value of the decimal point counter S, as in the usual case.

From the foregoing, one embodiment of the present invention has become apparent. The present system will now be described with reference to concrete numerical examples shown in FIGS. 7*a*–8*c*. FIGS. 7*a*–8*c* A and B represent 10-digit registers A and B respectively. The digit portions of each of the registers A and B are designated as the 0th-digit, 1st-digit, ..., 9th-digit respectively. These digit portions are represented as "order" on the flow chart. M indicates the denomination order memory M, and S shows the decimal point counter S.

From FIGS. 7*a*-8*c*, it will be seen that the contents in the respective digit portions of the registers A and B and the contents of the denomination order memory M and decimal point counter S are changed with lapse of time in each STEP.

FIGS. 7*a* and 7*b* shows the case where the number of which the square root is to be extracted is "3," and FIGS. 8*a*, 8*b* and 8*c* shows the case where such number is "30." The contents in those digit portions of the registers A and B which are not indicated by numerals are "0," but these are not shown.

The contents of the denomination order memory M and decimal point counter S are to be represented as in STEP XII and STEP XIII respectively, but for the sake of simplicity, they are represented as in STEP X.

As will be seen from FIG. 7*a* "3" is entered in the 0th-digit portion of the register A in STEP I, and the content of the register A is shifted to the left in STEP II so that "3" arrives at the (*n*/3)rd-digit or 7th-digit portion. Numerals such as 1, 2, ... added to X as suffixes in the STEP indication indicate that STEP X has been performed one time, two times, ..., respectively. For example, in the case of STEP X−1, the register A is shifted to the left by one digit, and the fact that the digit in the most significant digit position of the number resulting from the square root extraction is "1" is shown in the seventh-digit portion of the register B. In the case of STEP X−2, the fact that the digit in the most significant digit position of the number resulting from the square root extraction is "1" and that in the next digit position is "7" is indicated in the 6th-digit portion of the register B.

In the case of FIG. 7*b* a square rot extraction result of "17,320,508 " is obtained on the register B at "END" of STEP XIV. At that point, the content of the decimal point counter S is "7". Thus it will be seen that "1.7320508"is obtained as the square root of "3."

In the case of FIG. 8*c* a square root extraction result of "54,772,255" is obtained on the register B at "END" of STEP XIV. In this case, the content of the decimal point counter S is "7". Thus, it will be seen that "5.477,255" is obtained as the square root of "30".

In the foregoing, when a number of which the square root is to be extracted is considered as sectioned in each two digits with the decimal point position as the reference, the left shift in STEP II is continued until the less significant digit in the most significant one of the 2-digit sections of the number arrives at the (*n*−3)rd-digit portion of the register A, in case the number of which the square root is to be extracted is greater than "1". On the other hand, the number of which the square root is to be extracted is smaller than "1", the left shift is continued until the less significant digit of the most significant one of the two-digit sections which are less significant than the decimal point position arrives at the (*n*/3) rd-digit portion of the register A. It is to be understood however that the digit portion at which the aforementioned less significant digit is to arrive is by no means limited to the (*n*/3)rd-digit portion, and that the left shift may be continued until the aforementioned less significant digit arrives at any predetermined digit portion which is less significant than the (*n*/3)rd-digit portion.

Although the present invention has been illustrated and described with respect to particular examples, various modifications and changes will become possible without departing from the spirit and scope of the present invention. It is to be understood that such modifications and changes also constitute part of the present invention.

I claim:

1. An apparatus for extracting a square root of a number, comprising

A. a first shift register for initially storing said number and for subsequently storing partial results obtained during successive steps, B. a second shift register for subsequently storing the partially obtained root of said number during successive steps and for storing the finally obtained root of said number, C. a first means for producing said partial results as a first partial results by subtracting the number stored in said second shift register from the number stored in said first shift register for producing a first carry signal by discriminating whether the number stored in said first register is greater than or equal to the number stored in said second register, for producing said partial results as a second partial results by subtracting from the number stored in said first shift register a number which is equal to the number stored in said second shift register except that the digit in a predetermined digit position thereof is made greater than the digit in the corresponding digit position of the number in the second shift register by "1," for producing a second carry signal by discriminating whether the number stored in said first register is greater than or equal to the number which is equal to the number in the second shift register except that the digit in the predetermined digit position thereof is made greater than the digit in the corresponding digit position of the number in the second shift register by " 1", and for producing said partial results as a third partial results by adding the number stored in said first shift register and that stored in said second shift register to each other in the presence of said second carry signal, D. a second means for substituting the number in said first shift register by the first partial results in the absence of said first carry signal, for substituting the number in said first shift register by the second partial results in the absence of said second carry signal, for substituting the number in said first shift register by the third partial results in the presence of said second carry signal.

E. a third means for increasing the number in the predetermined digit portion of said second register by "1" in the absence of said second carry signal, and F. a fourth means for shifting the number in said first shift register by one digit when said first carry signal has been produced by said first means or said substitution by the third partial results has been effected by said second means.

2. An apparatus according to claim 1, further including a denomination counter for memorizing a denomination order of said second shift register, said denomination counter being adapted so that "1" is subtracted from a predetermined number initially entered therein every time the number in said first shift register is shifted by one digit by said fourth means.

3. An apparatus according to claim 1, further including a decimal point counter for indicating the position of the decimal point of the finally obtained root of said number, the content of said decimal point counter is initially set to a number corresponding to an integer part of a half of a number representing the digit position of the initially stored number in said first register, and thereafter "1" is added to the content of the decimal point counter every time the number in said first register is shifted by two digits by said fourth means.

4. An apparatus according to claim 1, further including means for shifting the number initially stored in said first register toward the most significant digit portion by a predetermined number of digits to be obtained from figures of the finally obtained root.

5. A method for extracting a square root of a number, comprising the steps of

A. entering said number into a first shift register,
B. shifting the number entered in said first shift register to the left by a predetermined number of digits after the step (A) has been effected,
C. discriminating whether the number in said first shift register is greater than or equal to a number in a second shift register after the step (B) has been effected,
D. substituting the number in said first shift register by a result obtained by subtracting the number in said second shift register from that in said first shift register when the latter is greater than or equal to the former after the step (C) has been effected,
E. discriminating whether the number in the first shift register is greater than or equal to a number which is equal to the number in the second shift register except that the digit in a predetermined digit position thereof is made greater than the digit in the corresponding digit position of the number in the second shift register by "1" after the step (D) has been effected,
F. substituting the number in said first shift register by a result obtained by subtracting from the number in the first shift register the number which is equal to the number in the second shift register except that the digit in the predetermined digit position thereof is made greater than the digit in the corresponding digit position of the number in the second shift register by "1" when the number in the first shift register is greater than or equal to the number which is equal to the number in the second shift register except that the digit in the predetermined digit position thereof is made greater than the digit in the corresponding digit position of the number in the second shift register by "1" after the step (D) has been effected,
G. increasing the number in the predetermined digit portion of said second register by "1" after the step (E) has been effected,
H. shifting the number in the first shift register to the left by one digit when in the step (C) the number in the first shift register becomes smaller than the number in the second shift register after the step (C) has been effected,
I. substituting the number in the first shift register by a result obtained by adding the number in the first shift register and that in the second shift register to each other when in the step (E) the number in the first shift register is smaller than the number which is equal to the number in the second shift register except that the digit in the predetermined digit position thereof is made greater than the digit in the corresponding digit portion of the number in the second shift register by "1" after step (E) has been effected,
J. shifting the number in the first shift register by one digit after the step (I) has been effected, and
K. taking out the square root extraction result from said second shift register finally.

6. A method according to claim 5 wherein the left shift of the first register effected in the step (B) is continued until the less significant digit in the most significant one of the two-digit sections defined by successively sectioning the number of which the square root is to be extracted from the decimal point position toward the most significant digit arrives at a predetermined digit portion of the first register corresponding to a predetermined digit portion of the second register where the most significant digit of a number resulting from the square root extraction which is obtained on the second register is located, in the case where the number of which the square root is to be extracted is greater than "1."

7. A method according to claim 5 wherein the left shift of the first register effected in the step (B) is continued until the less significant digit in the most significant one of two-digit sections defined by successively sectioning the number of which the square root is to be extracted from the decimal point position toward the least significant digit arrives at a predetermined digit portion of the first register corresponding to a predetermined digit portion of the second register where the most significant digit of a number resulting from the square root extraction is located, in the case where the number of which the square root is smaller than "1."

8. A method according to claim 6 wherein said predetermined digit portion of each of said first and second registers is the (−3)rd-digit portion where $n$ is the number of digit portions of each of said two registers, and these digit portions are designated as 0th-digit portion, 1st-digit portion, ...., $(n-3)$rd-digit portion, $(n-2)$nd-digit portion, $(n-1)$st-digit portion sequentially from the least significant digit portion to the most significant digit portion.

9. A method according to claim 7 wherein said predetermined digit portion of each of said first and second registers is the $(n-3)$rd-digit portion where $n$ is the number of digit portions of each of said two registers, and these digit portions are designated as 0th-digit portion, 1st-digit portion, ...., $(n-3)$rd-digit portion, $(n-2)$nd-digit portion, $(n-1)$st-digit portion sequentially from the least significant digit portion to the most significant digit portion.

10. A method for extracting a square root of a number, comprising the steps:

A. entering said number into a first shift register,
B. setting a predetermined number in a denomination counter,
C. shifting the number entered in said first shift register to the left by a predetermined number of digits corresponding to the predetermined number in the step (B) after the steps (A) and (B) have been effected,
D. setting a integer part of number obtained by dividing the number indicating the decimal point of the number entered in said first register one-half in a decimal counter after the step (C) has been effected,
E. discriminating whether the number in said first shift register is greater than or equal to a number in a second shift register after the step (D) has been effected,
F. substituting the number in said first shift register by a result obtained by subtracting the number in said second shift register from that in said first shift register when the latter is greater than or equal to the former after the step (E) has been effected,
G. discriminating whether the number in the first shift register is greater than or equal to a number which is equal to the number in the second shift register except that the digit in the predetermined digit position thereof indicated by the number in said denomination counter is made greater than the digit in the corresponding digit position of the number in the second shift register by "1" after the step (F) has been effected,
H. substituting the number in said first shift register by a result obtained by subtracting from the number in the first shift register the number which is equal to the number in the second shift register except that the digit in the predetermined digit position thereof is made greater than the digit in the corresponding digit position of the number in the second shift register by "1" when the number in the first shift register is greater than or equal to the number which is equal to the number in the second shift register except that the digit in the predetermined digit position thereof is made greater than the digit in the corresponding digit position of the number in the second shift register by 1 after the step (G) has been effected, I. Increasing the number in the predetermined digit portion of said second register by "1" after the step (G) has been effected, J. repeating the step (E) after the steps (H) and (I) have been effected, K. substituting the number in the first shift register by a result obtained by adding the number in the first shift register and that in the second shift register to each other when in the step (G) the number in the first shift register is smaller than the number which is equal to the number in the second shift register except that the digit in the predetermined digit position thereof is made greater than the digit in the corresponding digit position of the number in the second shift register by "1" after step (G) has been effected, L. discriminating whether the number in said denomination counter is "0" or not when the former number is smaller than the latter number in the step (E) or (G) after the step (E) OR (G) has been effected, M. shifting the number in said first shift register to the left by one digit when the number in said denomination counter is not "0" in the step (L) after the step (L) has been effected, N. discriminating whether the number of said denomination counter is odd or not when the former number is smaller than the latter number in the step (E) or (G) after the step (E) or (G) has been effected, O. increasing the number of said decimal counter by "1" when the number of said denomination counter is odd after the step (N) has been effected, P. subtracting from the number of said denomination counter by "1" every time the number of said first shift register is shifted in the step (M) after the step (L) has been effected, Q. repeating the step (E) after the step (M) has been effected, and R. taking out the square root extracting result from said second shift register when the number in the denomination counter is "0" in the step (L) after the step (L) has been effected.

UNITED STATES PATENT OFFICE

CERTIFICATE OF CORRECTION

Patent No. 3,610,904 Dated October 5, 1971

Inventor(s) Takafumi Kumagai

It is certified that error appears in the above-identified patent and that said Letters Patent are hereby corrected as shown below:

Abstract, line 6, change "25" to --is subtracted--.

Column 2, line 65, change "373" to --3--.

Column 3, line 6, change "(ad/2) a" to -- $\frac{ad}{2} \longrightarrow a$ --.

Column 3, line 53, change "(B) + 1a(m) ⟶ (B)" to --B + 1(m) ⟶ (B)--.

Column 5, line 73, change "sand" to --and--.

Column 8, line 35, change "(A)-(B) 11(M)≥0?" to --(A)-(B)-1(m)≥0?--.

Column 8, line 53, after the word "operation" insert --is initiated. That is, the instruction signal S7 is supplied--.

Column 9, line 64, change "based on he" to --based on the--.

Column 12, lines 32-33, change "BB" to --B ⟶ B--.

Column 12, line 45, change "M($\overline{0}$)=1b8" to --M($\overline{0}$)=1--.

UNITED STATES PATENT OFFICE

CERTIFICATE OF CORRECTION

Patent No. 3,610,904 Dated October 5, 1971

- 2 -

Inventor(s) Takafumi Kumagai

It is certified that error appears in the above-identified patent and that said Letters Patent are hereby corrected as shown below:

(continued)

Column 13, line 11, change "(n/3)rd" to --(n-3)rd--.

Column 13, line 49, change "(n/3)rd" to --(n-3)rd--.

Signed and sealed this 8th day of May 1973.

(SEAL)
Attest:

EDWARD M.FLETCHER,JR.
Attesting Officer

ROBERT GOTTSCHALK
Commissioner of Patents